United States Patent [19]
Rabeler

[11] 3,994,215
[45] Nov. 30, 1976

[54] METHOD AND APPARATUS FOR THE MANUFACTURE OF CHIPS OR FLAKES FROM FOOD SUBSTANCES

[76] Inventor: Hanshermann Rabeler, Jordanstrasse 23d, 8190 Wolfratshausen, Germany

[22] Filed: Mar. 18, 1975

[21] Appl. No.: 559,517

[30] Foreign Application Priority Data
Mar. 20, 1974  Germany............................ 2413470

[52] U.S. Cl.................................... 99/483; 99/353; 99/484; 425/223; 425/294; 425/296; 425/301; 425/367
[51] Int. Cl.².................... A21C 11/10; A21C 11/24
[58] Field of Search.................. 99/353, 355, 450.2, 99/450.3, 430, 483, 484; 100/168; 425/223, 294, 296, 301, 367

[56] References Cited
UNITED STATES PATENTS

| | | |
|---|---|---|
| 666,700 | 1/1901 | Savery ................................ 100/168 |
| 2,640,446 | 6/1953 | Morrison ............................ 425/223 |
| 2,923,259 | 2/1960 | Malnati............................... 425/294 |
| 2,974,364 | 3/1961 | Lambert ......................... 425/223 X |
| 3,123,656 | 3/1964 | Rochlin............................ 425/294 X |
| 3,481,284 | 12/1969 | Cambanis ....................... 425/223 X |
| 3,869,238 | 3/1975 | Racca ................................. 425/294 |
| 3,881,404 | 5/1975 | Ohkawa.............................. 99/353 |

*Primary Examiner*—Edward L. Roberts
*Assistant Examiner*—Alan Cantor
*Attorney, Agent, or Firm*—Bierman & Bierman

[57] ABSTRACT

Methd and apparatus for the manufacture of chips or flakes from food, stimulant, or feed materials such as fruits, vegetables, potatoes or the like in which a moist mass of material is deposited on a rotating cylinder. The film is formed on the drum and then removed therefrom, cut into strips and formed into typical chip-like shape, and then removed. A plurality of rotating knives is provided downstream of the cylinder to cut the film into strips and preferably to shape the chips as they are being cut.

25 Claims, 5 Drawing Figures

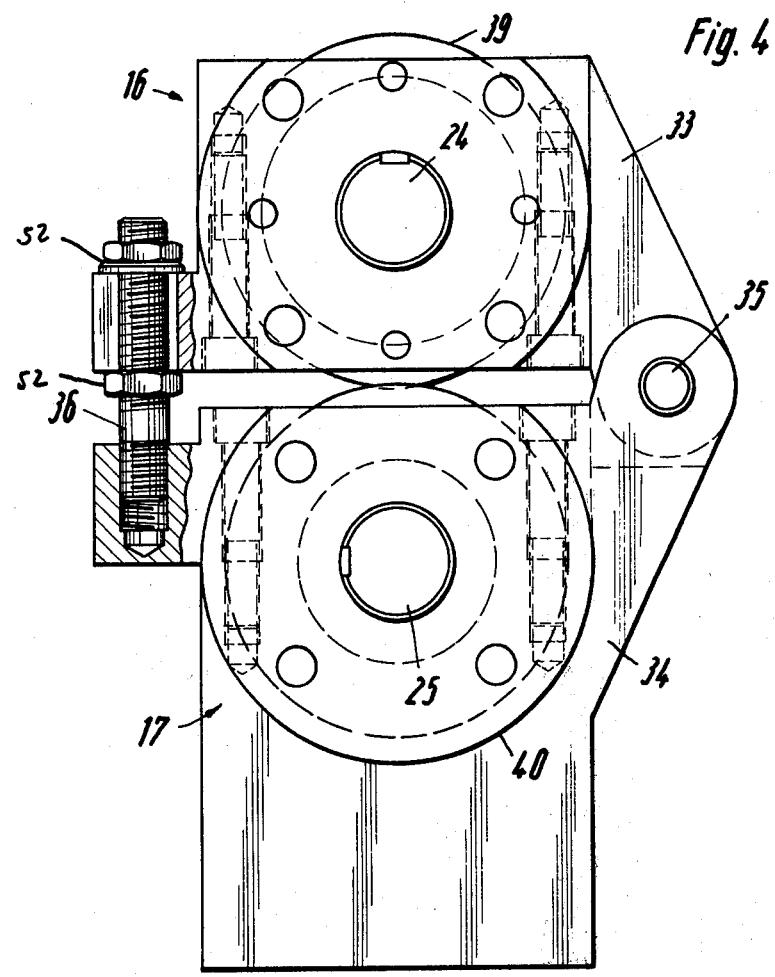
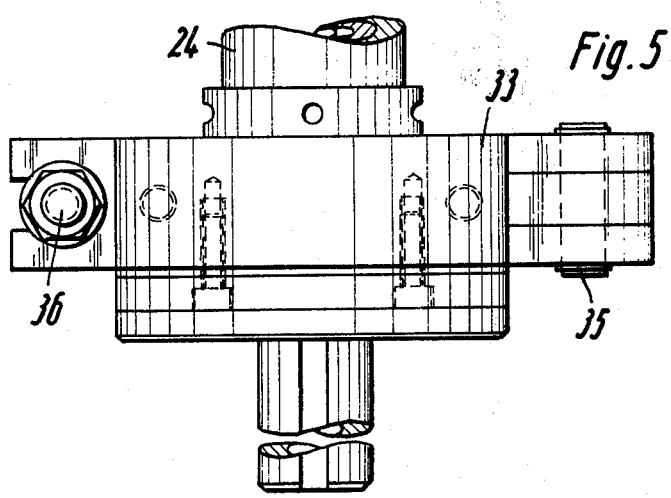

METHOD AND APPARATUS FOR THE MANUFACTURE OF CHIPS OR FLAKES FROM FOOD SUBSTANCES

This invention relates to an apparatus for the manufacture of chips or flakes from food, stimulant or feed materials such as fruits, vegetables, potatoes or the like which, with or without additives, are processed to form a more or less moist mass. The moist mass is applied in at least one relatively thin layer on a heatable support and, by removal of moisture, is formed into a cohering film of ductile or plastic consistency. The film may be smooth, preferably fluted or curled, and is then shredded or divided, possibly with further drying and/or cooling.

In the method in accordance with this invention, fruit flakes can be produced which have the form of flat lamellae. The flat lamella form of the flakes is often unsuitable, however, because in the package or in use the lamellae lie closely one on top of the other and may stick to each other. It is therefore one object underlying the present invention to provide an apparatus whereby the products can selectively be given a more or less arched or curved form, a form already in use in the case of chips. This is achieved according to the invention in that the film is shaped and cut by two shaping and knife rollers rotating oppositely about parallel axes. The shaping and knife rollers have disk type knives arranged in rows alternately on their shafts. The profile bodies of the knives cooperate to leave radial distances which form longitudinal strips correspondingly profiled in cross-section. The strips are then divided by a cross-cutting device or the like into sections of the desired length.

By means of this apparatus, more or less greatly curved or arched chips can be produced by proper selection of the profile bodies. Preferably the circumferential surfaces of the profile bodies are of wave form, these profiles interengaging more or less but leaving interstices. By radial displacement of the shafts of the shaping and knife rollers, the interstices between the profiles can be adjusted so that the desired material thickness is obtained. Since the profiles may also be flat, the equipment can, if needed, be used also for the production of flat flake lamellae. The cross-section forms of the chips or flakes can be varied at will by installation of readily exchangeable profile bodies.

Due to the curved or arched form of the chips, they remain loose during storage and use and have an attractive appearance.

By means of the apparatus according to the invention, fruit chips, e.g. of fruits such as oranges, apricots, pineapples, bananas, guavas or the like can be produced. As raw material, both fresh and pasteurized or frozen fruits in the form of fruit pulp, fruit puree, strained and homogenized fruits may be used. The term "fruit pulp" is to cover these and similar forms of the fruit mass. As starch-containing additives, corn flower or a similar product is preferred because of its low cost and particular fitness for the purposes of the invention. By the general term "sugar" must be understood beet or cane sugar as well as molasses, glucose, etc. As an example, one particular composition of the wet material may contain, in percent by weight, about 80–85% fruit pulp or the like, 5–10% sugar or the like, and 5–10% starch-containing substances such as cereals or the like. The weight ratio of wet to dry substance may be, for example, about 3:1. Thus, for example, from 303 kg wet substance-about 96 kg dry substance are obtained. It should be noted also that optionally the addition of special ingredients such as taste-improving substances, vitamins, spices, etc. may be used if desired.

In corresponding manner, the processing of potatoes or vegetables to chips can be carried out. The processing of vegetables can occur advantageously without addition of fat. Also animal feed can be produced in this way in chip or flake form from suitable nutrients.

Further advantageous features of the invention are characterized in greater detail in the following description and in the claims.

Referring now to the drawings in which a preferred embodiment is illustrated and in which like numerals refer to like parts;

FIG. 4 shows an end view of the roller suspension of FIG. 3; and

FIG. 5 is a top view of the roller suspension of FIG. 4.

Figure 1:
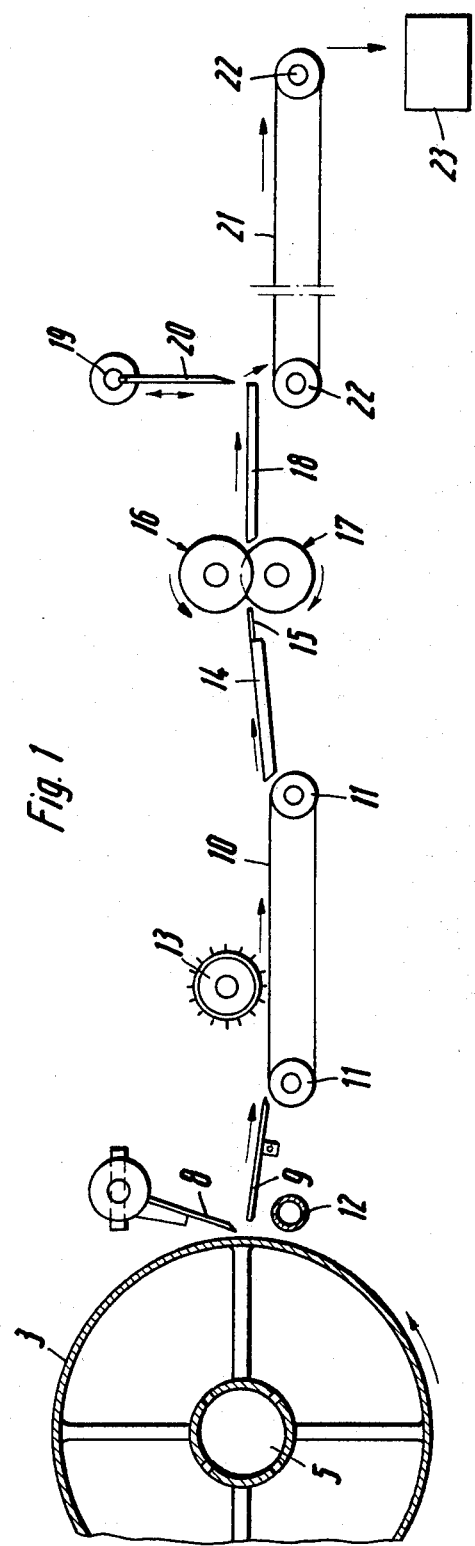
FIG. 1 is a diagrammatic representation of a production plant.
Figure 2:
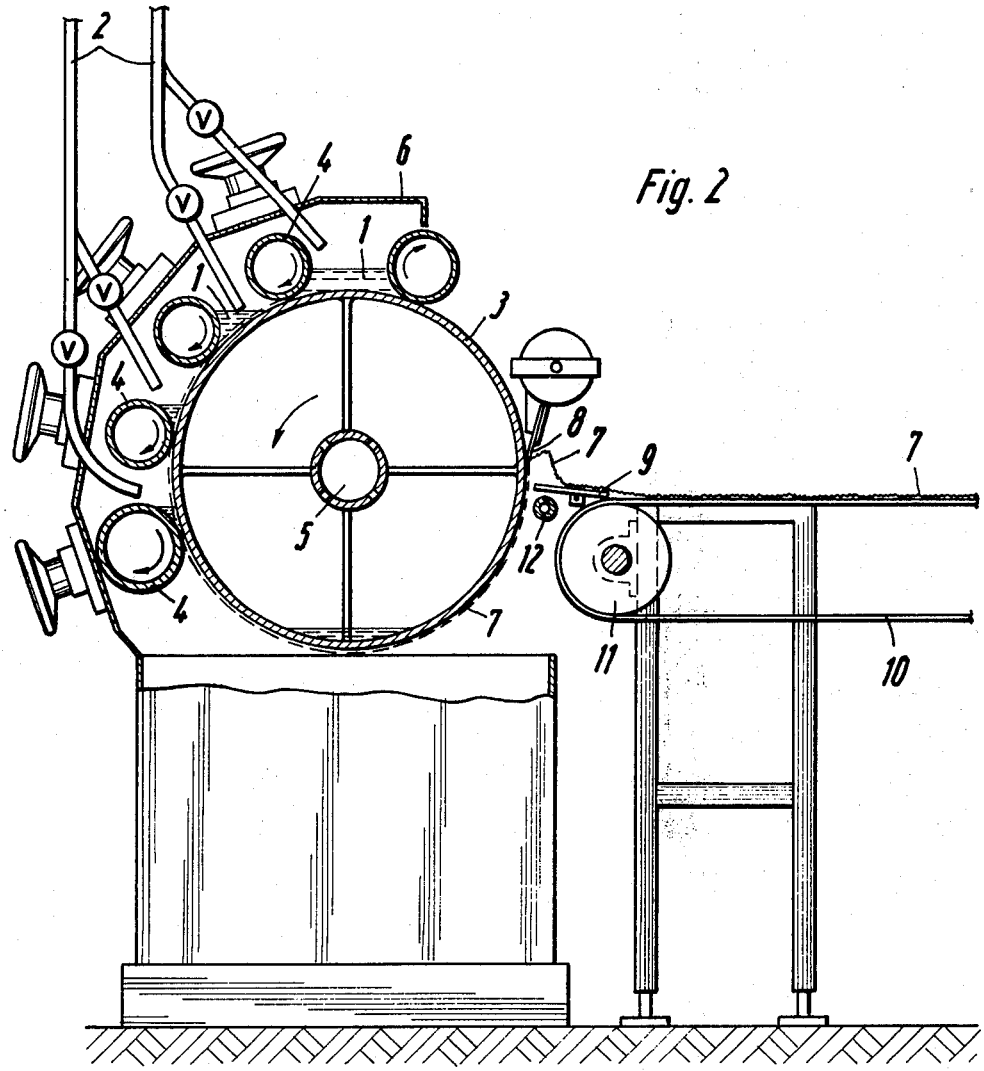
FIG. 2 shows on a larger scale the left-hand portion of the plant of FIG. 1.

As can be seen from FIGS. 1 and 2, a moist mass of material from a conventional storage or mixing vessel (not shown) is charged through lines 2 to one or more points on a rotatable and heatable drying cylinder 3 and uniformly distributed thereon. For this purpose, one or more successive conventional charging rollers 4 may be provided in known manner.

The width of the drying cylinder 3 may be selected as desired. If two or more charging rollers 4 are provided, fresh mass 1 is supplied in front of each charging roller as shown in FIG. 2 and distributed over the width of the drying cylinder 3. The drying cylinder 3 is heated, for example, by saturated steam of about 4–6 atmospheres gauge introduced through a hollow shaft 5 and into the interior of the cylinder, preferably to a temperature of about 110° C–140° C. The vapors formed during removal of moisture from the mass are exhausted by means of a suitable device, e.g. through a vapor box 6. In one embodiment, the thickness of the film 7 on the drying cylinder 3 can be, for instance, about 1–2mm, and the width of the drying cylinder 3 may be 2.50 meters. However, it is to be understood that dimensions desired other than those given here for illustrative purposes may be used.

The material film 7 forming on the drying cylinder 3 circulates with the cylinder surface over a circumferential angle of for example 270°, moisture being removed from the film as it travels around the cylinder. While the material film 7 is still in a ductile or thermoplastic state, it is scraped off the drying cylinder 3 by a sharp scraping knife 8 pressed against the cylinder surface, whereupon it travels from the scraping knife 8 a relatively short distance of for example 16 to 20 mm freely, i.e. without support. The removed film then reaches a smooth, preferably inclined guide sheet 9. The guide sheet 9 ends at a small distance from the surface of the drying cylinder 3 and guides the film onto a moving conveyor belt 10. The conveyor belt 10, running over rotating rollers 11, consists for example of a wire mesh or other rough surface which entrains the material film 7.

The structure characteristic of the chips, i. e. irregular fluting, curling or waffle type structures with alternately thin and thick layers occurs generally in the zone where the material is scraped off cylinder 3. This occurs by continuous accumulation, compression, braking and/or tugging and pulling of the film, i.e. a change in density of the film. The change in structure occurs preferably at the scraping knife 8 and on the following free path between the scraper knife 8 and guide sheet 9, and it can continue further as the material film 7 is being transferred on the guide sheet 9 to the conveyor belt 10. Air is blown under the stripped material film 7 or between it and the guide sheet 9, over the entire width of the film, from an air nozzle 12. The structure formation in film 7 can be controlled by adjusting the circumferential speed of the drying cylinder 3 and by adjusting the running speed of the conveyor belt 10 so that the rate at which the film is moved to the scraper knife is different from the speed at which it is removed by the conveyor. A reduction of the running speed of the conveyor can cause, for example, compression of the material. However, the mass of the film, e. g. in the case of fruit chips, because of the action of the sugar content or the caramelization of the mass, will remain coherent. It should be noted that the process can optionally be carried out using vacuum instead of air.

A rotatable, brush type barbed roller 13 may be placed above conveyor belt 10 to advance or to brake the film, if further braking or advancing action is desired.

If the film should not be fluted or structured, but should be more or less smooth, as is sometimes desired in the case of vegetable chips, this can be achieved by corresponding variation and adjustment of the scraping knife 8, of the guide sheet 9, and of the circumferential speed of the dryng cylinder 3 as well as of the speed of the conveyor. Of course other or additional devices may be provided for this purpose, such as barbed roller 13.

Further drying of the film occurs on the conveyor belt 10. The belt dryer may optionally be lodged in a housing and can be heated in any desired manner. At the end of the conveyor belt, however, the mass of the film should still be thermoplastic and deformable as well as cuttable, so that it can be subjected to subsequent shaping.

The conveyor belt 10 is followed by a double-walled guide sheet 14, which can be cooled or heated, to be able to control the consistency of the mass of the film. A telescoping transfer sheet 15 can be used to lengthen or shorten the guide sheet 14 for exact adjustment. Thereupon the film reaches the zone of the cooperating shaping and knife rollers 16, 17 designed according to the invention, which cut the film into lengthwise strips and at the same time shape the material strip, for instance, in the shape of a trough.

The strips thus shaped are fed via an additional double-walled coolable or heatable guide sheet 18 to a cross cutting device, which cuts the strips to the desired chip length. For this purpose there is provided, for example, a cross knife 20 extending over the width of the guide sheet 18, which can be moved vertically up and down by means of a rotatable eccentric disk 19 and which cooperates with the terminal edge of the guide sheet 18. The eccentric drive 19 serves to adjust the desired length, or shortness, of the chips. The cross knife may be provided as a plurality of knives 20, and need not necessarily cut all the way through the thickness of the strips: a partial cut, for example through ⅔ or ¾ of the thickness, may suffice, whereupon the chips break off by themselves. In the case of vegetable chips, the material is dried especially intensely before cross cutting. The divided chips are fed to a conveyor belt 21, likewise continuously adjustable and running around rotating belt rollers 22, where they may be subjected to final drying or to a cold shock or other final treatment. Lastly, at the end of the conveyor belt 21, the finished chips fall, for example, into a collecting bin 23 or onto another conveyor belt leading to the packing device.

Figure 3:
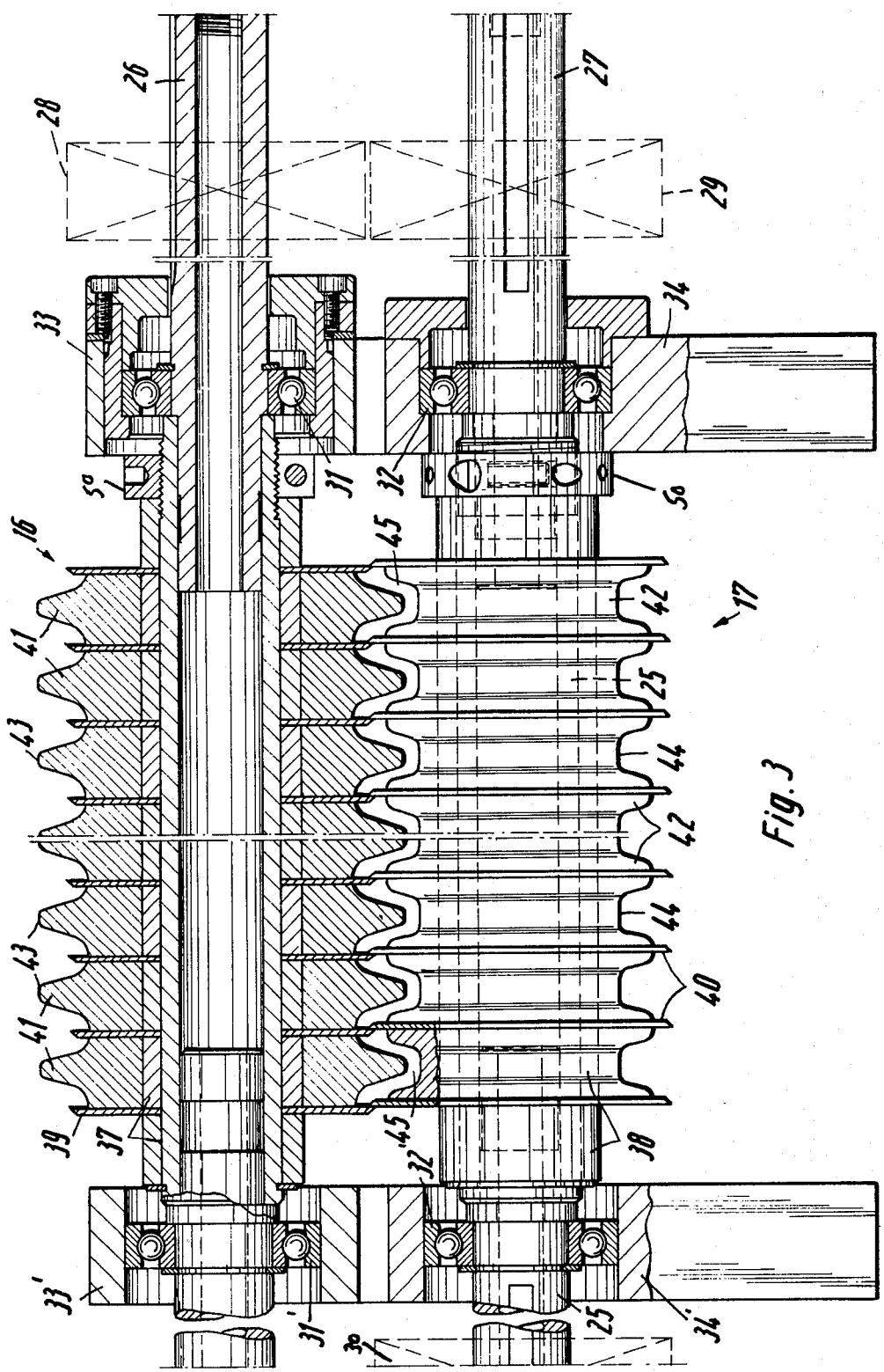
FIG. 3 shows, partly in longitudinal section, partly in side view, the shaping and knife rollers along with their suspension system.

The shaping and knife rollers 16, 17 and their suspensions are shown separately in FIGS. 3–5. Each roller is mounted on a hollow shaft 24, 25, each of which is elongated on the right side, as viewed in FIG. 3, by inserted hollow shaft connecting pieces 26, 27. The shaft connecting pieces 26 and 27 are coupled together by gears 28 and 29. The lower hollow shaft 25 carries a drive gear 30 on the side of the shaft opposite gears 28, 29. Drive gear 30 is shown connected only to shaft 25. By virtue of gears 28, 29, the two shafts 24, 25 are set in synchronous rotation. The shafts 24, 26 and 25, 27 are mounted in ball bearings 31, 32, which in turn are supported by bearing bodies 33, 34. As shown in FIGS. 4 and 5, bearing body 33 is mounted by means of a pivot 35 on the stationary bearing bodies 34.

In addition, another pair of bearings, denoted by numerals 31' and 32', are positioned about shafts 24, 25 respectively to the left side, as viewed in FIG. 3. Bearing bodies 33', 34' are provided on this side as well, and bearing body 33' is mounted to stationary bearing body 34' by means of a pivot 35'. This pivotal mounting of bearing bodies 33, 33' permits the lifting of these bearing bodies along with the shaping and knife roller 16, thereby facilitating installation and cleaning of the shaping and knife roller.

The bearing bodies 33, 34 are connected together by screws 36, as are bearing bodies 33', 34' (not shown), to maintain the knives in proper position during operation of the device. Also, at least one of the hollow shafts 24, 25 is axially displaceable for the purpose of adjusting the roller knife clearance.

This can be achieved, for instance, by replacing one of spacers 50 with another spacer having a smaller thickness. In addition, one, preferably the upper, hollow shaft 24 is adjustable in vertical or radial direction. This can be done, for instance, by changing the position of nuts 52 on screw 36, i.e. moving the two nuts 52 upwardly as viewed in FIG. 4. Through the hollow shafts the shaping and knife rollers 16, 17 can be heated or cooled by means of steam or water or other conventional medium.

On the hollow shafts 24 and 25, spacer rings 37, 38 are set up in rows, between which disk type knives 39, 40 and annular profile bodies 41, 42 are fastened at regular intervals. The knives 39, 40 are advantageously hollow-ground and made of HSS steel (super-speed steel). According to an especially advantageous embodiment of the invention, the profile bodies 41, 42 consist of sufficiently firm cellular rubber, foam rubber or the like, having a rough surface for gripping the film and for drawing it into the rollers. The profile bodies 41, 42 may, however, be made of other suitable materials, as for example, plastic, wood or metal.

In one example, each hollow shaft 16, 17 may have, for example, 88 knives and a corresponding number of profile bodies. The profile bodies 41 have projections 43 of wave-shaped cross-section, while the profile bodies 42 have corresponding wave-shaped necks 44. These profile bodies 41 and 42 are opposite each other so that the projections 43 engage into the necks 44, with a small clearance, preferably substantially equal to the desired film thickness. The spacings result in undulating curved interstices 45, into which the film 7 is drawn and shaped in trough form. At the same time the film is cut into longitudinal strips by the knives 39, 40, which, as shown in FIG. 3, are adjacent each other in scissorlike fashion. By the vertical adjustment of the shaping and knife rollers 16, 17 in relation to each other, the thickness of the desired chips can be varied within certain limits. Also, by corresponding profiling of the profile bodies 41, 42 any desired curvature or cross arching of the strips can be obtained. In the limit case, the profiles may be so flat that practically flat or only very slightly arched flake lamellae are produced.

Many variations of the above-described embodiment will occur to those skilled in the art. It is intended to cover all such modifications which do not constitute a departure from the spirit and scope of the invention as defined in the claims appended hereto.

What is claimed is:

1. Apparatus for the manufacture of chips or flakes from a food substance in which the food substance is processed to form a moist mass which can be formed into a film comprising: a support, means for depositing said moist mass on said support in a thin film-like layer; means for removing moisture from said film-like layer on said support to form a coherent film, means for removing the film from the support; and means for cutting said film into strips and for shaping said strips, said means for cutting said film into strips comprising a pair of knife rollers each having a plurality of blades thereon spaced axially along the rollers, the blades of one roller engaging cooperating blades of the other roller in scissor-like fashion to cut said film, the rollers of each knife rotating about parallel axes and in opposite directions, a plurality of annular undulating profile bodies on each roller positioned between adjacent blades, the profile bodies on one said roller cooperating with the profile bodies on the other said roller and having a space between cooperating profile bodies, the profile bodies on one roller being opposite in shape to the cooperating profile bodies on the other said roller, said blades separating said film into a plurality of strips, and a cross-cut means for cutting the strips into film sections of selected length.

2. Apparatus according to claim 1, wherein each knife roller is mounted on a shaft, the shafts being axially adjustable relative to each other.

3. Apparatus according to claim 2, wherein the said shafts are radially adjustable relatively to each other.

4. Apparatus according to claim 2, wherein the said shafts are hollow.

5. Apparatus according to claim 2, wherein the parts of the cooperating profile bodies which contact the film have a rough surface.

6. Apparatus according to claim 2, wherein the cooperating profile bodies comprise an elastically flexible material.

7. Apparatus according to claim 2, wherein the cooperating profile bodies comprises a material selected from the group consisting of cellular rubber and foam rubber.

8. Apparatus according to claim 2, wherein the profile bodies of one roller have profile projections therein, the profile bodies on the other said roller having cooperating profile necks of opposite profile, there being a space between the profile bodies when they are in cooperating position.

9. Apparatus according to claim 2, wherein the circumferential surfaces of the profile bodies are profiled in wave form, the profile bodies on one roller being in the shape of wave crests and the profile bodies on the other roller having a cooperating wave trough shape.

10. Apparatus according to claim 1, wherein the rollers are relatively moveable away from each other.

11. Apparatus according to claim 10, further comprising one or more pair of bearing bodies mounted on said shaft, the bearing bodies on each shaft being connected to the bearing body on the other shaft via a pivot.

12. Apparatus according to claim 11 wherein one of said bearing bodies is stationary and the other bearing body of said pair is movable about said pivot.

13. Apparatus according to claim 1, wherein the blades are disk type knives and are hollow-ground.

14. Apparatus according to claim 1, wherein the food substance is stimulant.

15. Apparatus according to claim 1, wherein the food substance is fruit.

16. Apparatus according to claim 1, wherein the food substance is vegetables.

17. Apparatus according to claim 1, wherein the food substance is potatoes.

18. Apparatus according to claim 1, wherein the food substance contains additives.

19. Apparatus according to claim 1, wherein said support is a rotatable and heatable drying cylinder and wherein said means for removing the film from the support comprises a scraping knife, and further comprising conveyor belt means, a guide sheet positioned between said drying cylinder and said conveyor belt for transferring the material removed from the cylinder to the conveyor belt, said guide sheet being located adjacent the circumference of said cylinder and adjacent said scraping knife.

20. Apparatus according to claim 19, further comprising means for changing the relative density of the film, said means being located adjacent the scraping knife.

21. Apparatus according to claim 19 further comprising an air nozzle positioned between the guide sheet and the drying cylinder.

22. Apparatus according to claim 19, further comprising means for adjusting the circumferential speed of the drying cylinder and the running speed of the conveyor belt to different values.

23. Apparatus according to claim 19, wherein the guide sheet is inclined between the drying cylinder and the conveyor, said guide sheet further comprising means for cooling the film as it moves over the guide sheet.

24. Apparatus according to claim 19, further comprising means for heating said guide sheet.

25. Apparatus according to claim 19, further comprising means for cooling said guide sheet.

* * * * *